Feb. 19, 1935.  D. R. McLAIN ET AL  1,991,564
APPARATUS FOR PACKING COFFEE
Filed Sept. 17, 1931  2 Sheets-Sheet 2
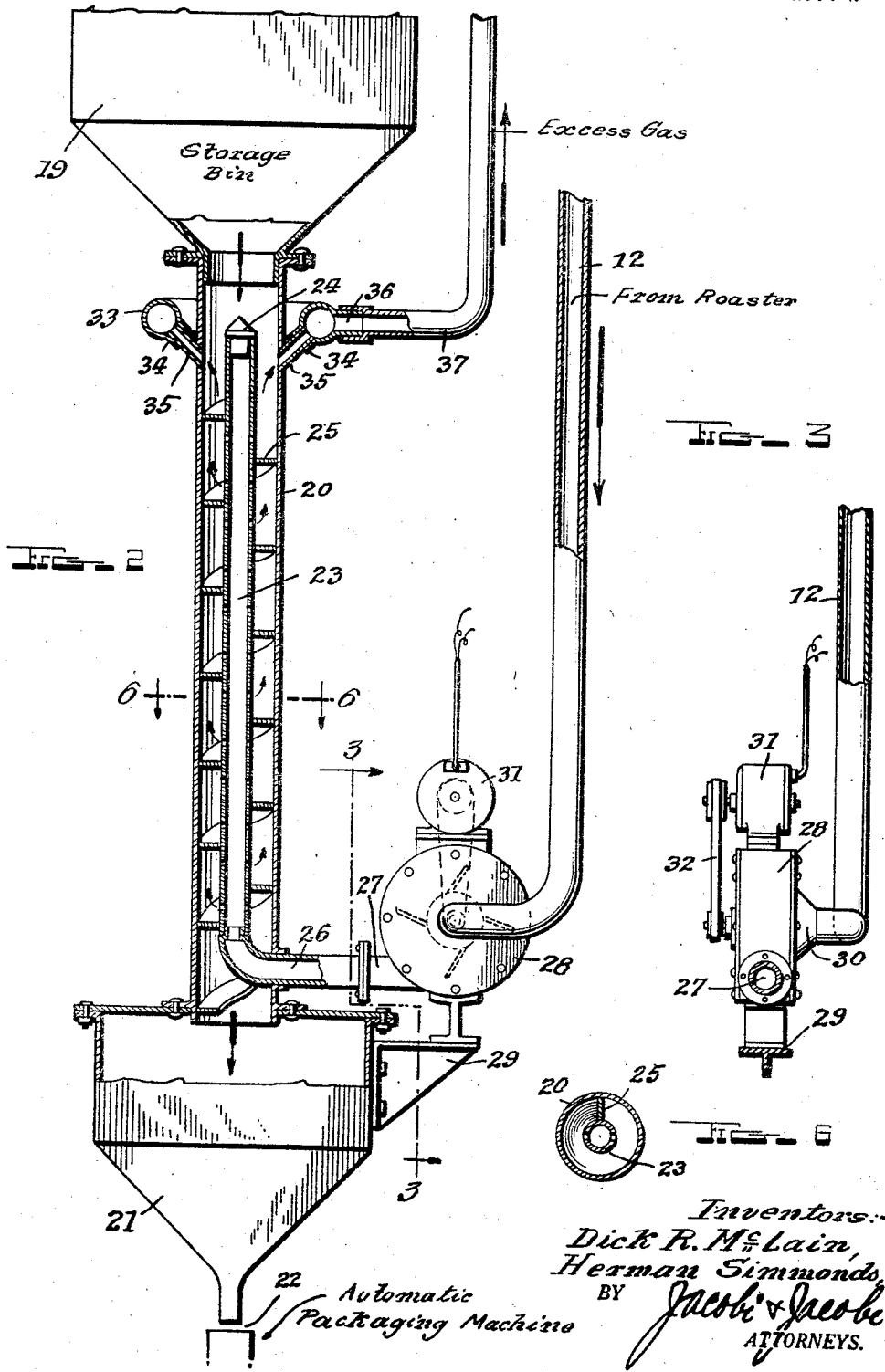

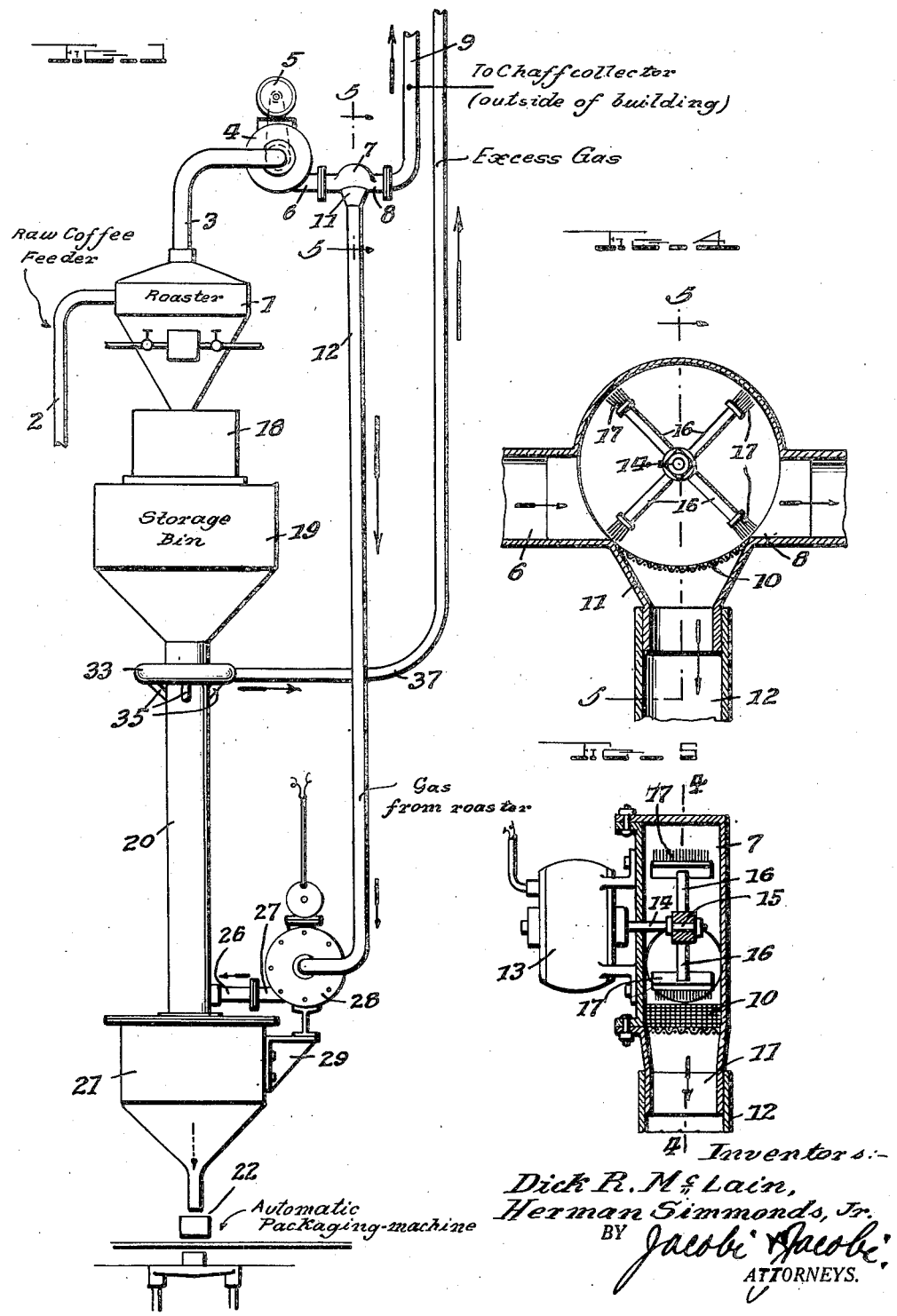

UNITED STATES PATENT OFFICE 1,991,564

APPARATUS FOR PACKING COFFEE

Dick R. McLain, Larchmont, and Herman Simmonds, Jr., New York, N. Y.

Application September 17, 1931, Serial No. 563,446

5 Claims. (Cl. 99—2)

This invention relates to an improved method of an apparatus for packing coffee. At the present time it is customary to roast the green coffee bean after which the roasted beans are ground and the ground coffee then packed in cans, bags or other suitable containers but it has been found that during the roasting process the coffee loses part of its strength and aroma due to the fact that gases which are generated during the roasting process pass off into the atmosphere and are lost.

Therefore, one object of this invention is to provide an improved method of and apparatus for treating the coffee whereby the gases generated during the roasting process are passed through the ground coffee as it moves toward a packaging machine thereby causing the gases to be absorbed by the freshly ground coffee and greatly add to the flavor, strength and aroma of the coffee.

Another object of the invention is to so arrange the elements of this improved apparatus that the gases passing from the roaster will be delivered to a conduit through which the ground coffee passes to a packaging machine without the gases becoming mixed with air thereby preventing the gases from losing their strength due to air becoming mixed with them.

Another object of the invention is to provide the conduit with an escape for gases thereby permitting a good circulation to take place and the gases pass freely through the ground coffee and insure absorption of the gases by the coffee.

While the process and apparatus has been referred to as a method of and apparatus for packaging ground coffee, it will be understood that it is not restricted to this specific use but may be used in connection with other food products, pharmaceutical products and other products for which it may be found suitable.

An apparatus for carrying out the improved method is illustrated in the accompanying drawings wherein:

Figure 1 is a view in side elevation of the improved apparatus.

Figure 2 is a view showing the conduit through which the ground coffee passes partially in vertical section and partially in elevation.

Figure 3 is a sectional view taken along the line 3—3 of Figure 2.

Figure 4 is an enlarged sectional view through the upper portion of the gas supply pipe and the pipe from which it extends, the view being taken along the line 4—4 of Figure 5.

Figure 5 is a sectional view taken along the line 5—5 of Figure 4 or Figure 1, and Figure 6 is a sectional view taken transversely through the coffee conduit along the line 6—6 of Figure 2.

The roaster 1 forming part of this apparatus is of a conventional construction and provided with a feeder 2 through which raw coffee passes to the roaster. During the roasting gases are generated by the green coffee and this gas together with chaff passes out through a pipe 3 rising from the top of the roaster. The pipe 3 leads to a fan housing 4 in which is mounted a rotary fan driven by a motor 5 and the gas and chaff is driven through the outlet neck 6 of the fan housing into a chamber 7 forming part of a coupling 8 which connects the outlet with a pipe 9 leading to a chaff collector upon the roof of a building or at any other convenient point.

By referring to Figures 4 and 5 it will be seen that within the chamber 7 is seated an impeller by means of which chaff is to be moved across a screen 10 serving as a guard for an outlet 11 leading from the bottom of the chamber and communicating with a pipe 12. The operating motor 13 for the impeller is secured to a side wall of the chamber 7 with its shaft 14 extending into the chamber as shown in Figure 5 and upon this shaft is fixed a hub 15 from which extend radiating arms 16 carrying brushes 17 at their free ends. The chamber 7 is circular as shown in Figure 4 and therefore the brushes may move across the strip of screening 10 and serve to sweep from this screening any chaff which may have settled upon the screening due to suction exerted through the pipe 12 and outlet 11. It will thus be seen that while gases passing through the chamber may be drawn through the outlet and pipe 12 chaff will be prevented from passing through the outlet with the gas and will be swept into the pipe 9 through which it will pass to the chaff collector. Only a portion of the gases pass through the pipe 12 and the remaining gases will pass through the pipe 9 with sufficient force to carry the chaff through this pipe to the chaff collector.

The coffee after being roasted in the roaster is delivered from the same to a grinder 18 where it is ground as fine as desired and from the grinder the coffee passes to a storage bin 19 at the upper end of a conduit 20 through which the ground coffee passes to a hopper 21 mounted in operative relation to an automatic packaging machine constructed in a conventional manner and indicated in general by the numeral 22. It will be understood that only a small portion of a packaging machine is shown in the accompanying drawings and no attempt has been made to illustrate the details thereof.

Referring now to Figure 2 it will be seen that within the conduit 20 is located a core or pipe section 23 having its upper end closed by a plug 24 which is tapered so that ground coffee will not accumulate thereon as it passes through the conduit from the storage bin. This pipe section which extends axially through the conduit is surrounded by a spiral strip 25 and the core has perforations in its side so that gases fed to this pipe may pass outwardly through the side openings and move upwardly through the conduit for absorption by the ground coffee passing downwardly about the core. Due to the presence of the strip 25 the ground coffee will move downwardly through the conduit in a spiral path and will have ample time to absorb gases as it moves through the conduit into the hopper with which the lower end of the conduit communicates.

At its lower end the core or perforated pipe section 23 communicates with an elbow 26 which extends outwardly through a side of the conduit above the hopper and is connected with the discharge neck 27 of a fan housing 28. This fan is supported upon a bracket 29 mounted upon the hopper 21 and at one side the fan is provided with a centrally located inlet 30 with which the lower end of the pipe 12 communicates. The fan may be driven by a motor 31 mounted upon the fan housing and connected with the rotor of the fan by a belt 32. In view of the fact that the gases generated by the roasting coffee pass through the pipe 3 into the fan housing 4 from which it is forced through the chamber 5 and drawn downwardly through the pipe 12 to the fan 28 which feeds it through the elbow 26 to the core or perforated pipe section 23 the gases will be delivered into the conduit without being exposed to the air and will not be weakened by having air mixed therewith. This gas passes upwardly through the conduit and becomes thoroughly intermingled with the downwardly moving ground coffee. Therefore, the ground coffee will absorb the gases generated during roasting of the coffee and this will greatly increase the strength, flavor and aroma of the coffee. In order to establish a circulation and thereby permit the gases to move freely through the conduit and allow surplus gases to escape there has been provided a manifold 33 in the form of a circular pipe which fits about the upper portion of the conduit 20 and is provided with a suitable number of inlets 34 from which extend short pipe sections or nipples 35 leading to and communicating with the conduit 20. These nipples extend upwardly at an outward incline from the conduit and serve as supports for the manifold as well as nipples through which excess gas may pass from the conduit into the manifold. At one point about its circumference the manifold is provided with an outlet 36 engaged with the lower end of a pipe 37 leading to the roof of a building or to any point desired where excess gas is to be discharged into the atmosphere.

We have therefore provided an improved method of and apparatus for delivering gases generated by roasting coffee to the coffee after it has been ground and causing the gases to pass through the ground coffee for absorption thereby as the coffee moves from a grinder through a conduit to a packaging apparatus.

From the foregoing description of the construction of our improved invention the operation thereof and the method of applying the same to use will be readily understood. It will be seen that we have provided a simple, inexpensive and efficient means for carrying out the objects of the invention.

While we have particularly described the elements best adapted to perform the functions set forth, it is obvious that various changes in form, proportion and in the minor details of construction may be resorted to, without departing from the spirit or sacrificing any of the principles of the invention.

Having thus described the invention what is claimed is:

1. In an apparatus of the character described, a roaster, a grinder, and means for delivering ground material from said grinder to packing apparatus without exposing the material to atmosphere including a conduit through which the material passes, and means for conveying gases generated by material in said roaster from the roaster and directly delivering the gases into the conduit for passage through and absorption by material in the conduit without exposing the gases to atmosphere.

2. In an apparatus for preparing coffee for packing, a roaster, a grinder, and means for conveying ground coffee from said grinder to packing apparatus without exposing the coffee to atmosphere, and means for delivering gases generated by the roasting coffee from said roaster directly to said conveying means for passage through and absorption by ground coffee passing through the same without exposing the gases to atmosphere.

3. In an apparatus for preparing coffee for packing, a roaster, a grinder, and a storage bin having direct communication with each other, a hopper for delivering ground coffee to a packaging machine, a conduit leading directly from said bin to said hopper, a chaff and gas outlet pipe for said roaster, and piping leading from said outlet pipe and entering said conduit near said hopper for delivering gases into the conduit for absorption by ground coffee passing through the conduit without exposing the coffee and gases to atmosphere.

4. In an apparatus for preparing coffee for packing, a roaster, a grinder, and a storage bin having direct communication with each other, a hopper for delivering ground coffee to a packaging machine, a conduit leading directly from said bin to said hopper, a chaff and gas outlet pipe for said roaster, a suction fan, a pipe leading therefrom from the outlet pipe for delivering gases to said fan, and a pipe leading from said fan into said conduit adjacent said hopper for delivering gases into the conduit for absorption by ground coffee passing through the conduit without exposing the gases to atmosphere.

5. In an apparatus for preparing coffee for packing, a roaster, a grinder and a tubular conduit for ground coffee having direct communication with each other and means delivering gases passed off from said roaster directly into said tubular conduit at the opposite end thereof from the grinder and distributing the gases therein for absorption by ground coffee passing through the same without exposing the gases to atmosphere.

DICK R. McLAIN.
HERMAN SIMMONDS, Jr.